Aug. 23, 1949.                A. HOWARD                    2,479,573
                         GAS TURBINE POWER PLANT
Filed Oct. 20, 1943                                   5 Sheets-Sheet 1
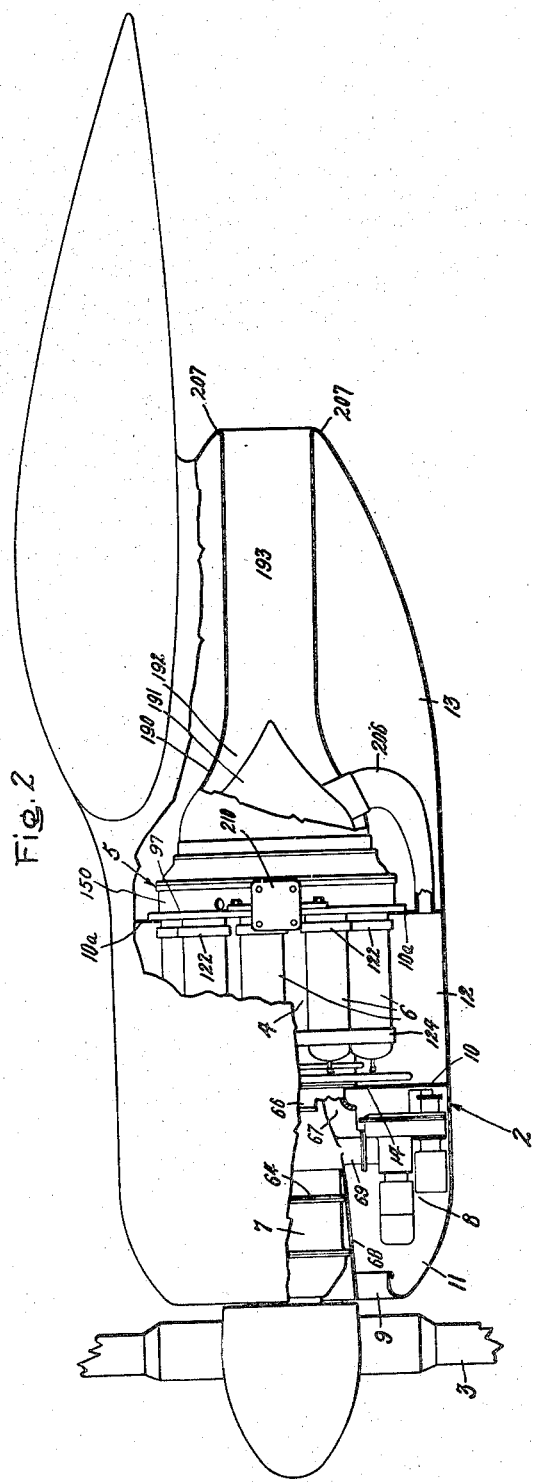
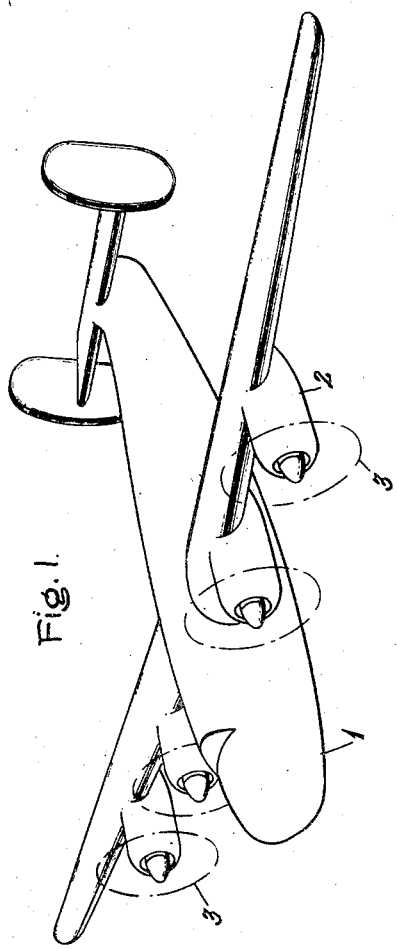
Inventor:
Alan Howard,
by Harry E. Dunham
       His Attorney.

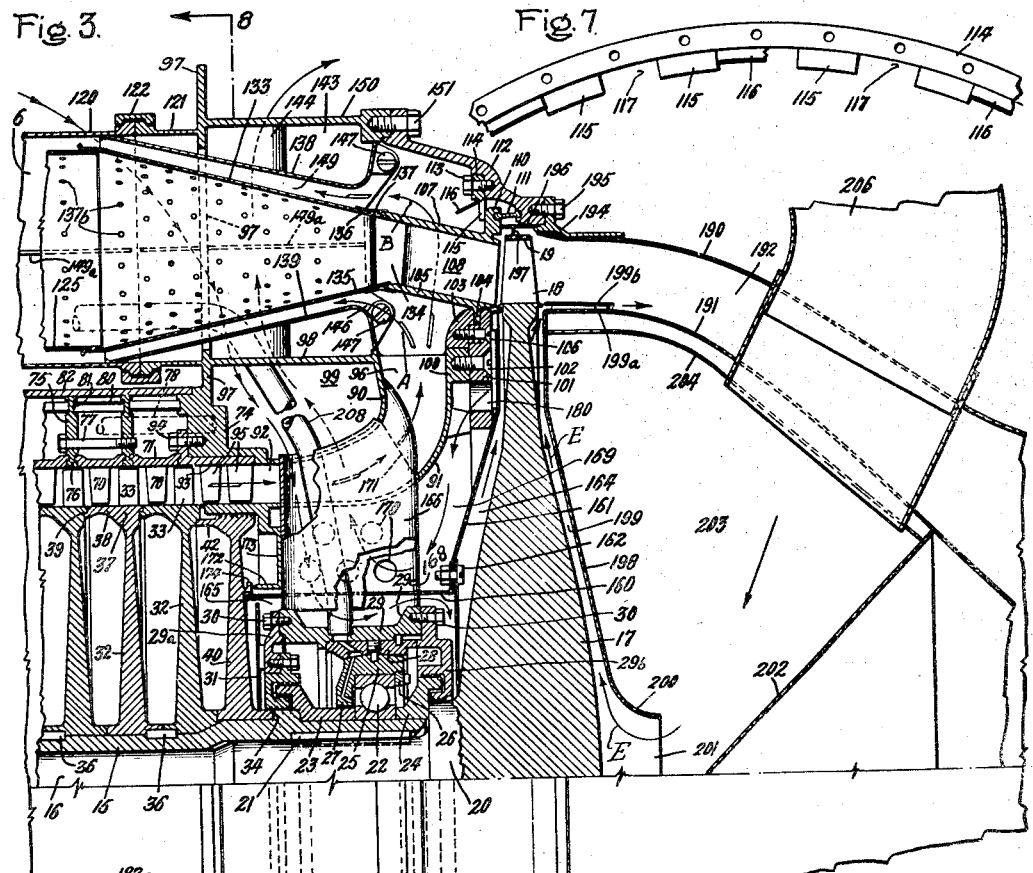

Aug. 23, 1949.  A. HOWARD  2,479,573
GAS TURBINE POWER PLANT
Filed Oct. 20, 1943  5 Sheets-Sheet 4

Inventor:
Alan Howard,
by Harry E. Dunham
His Attorney.

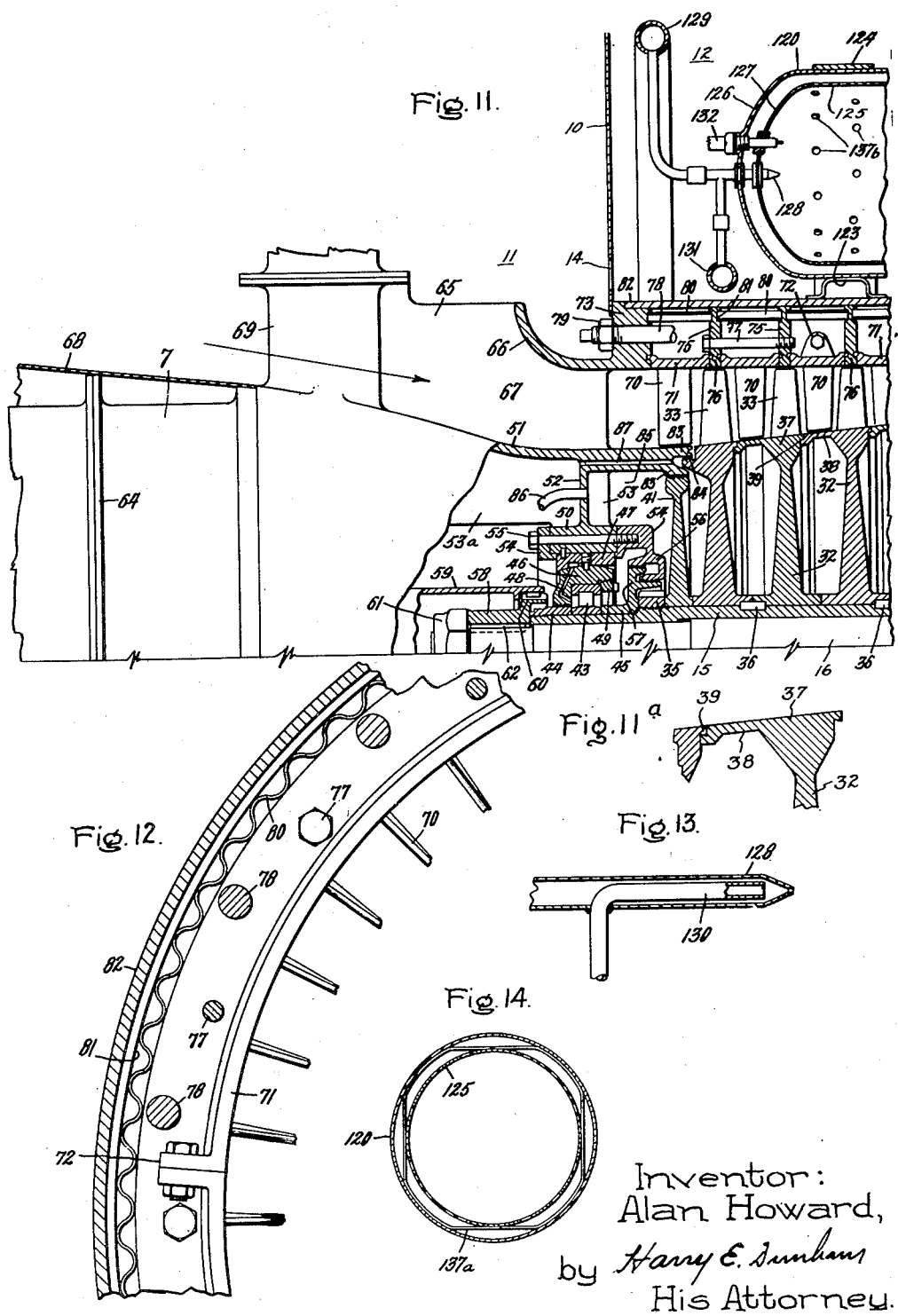

Patented Aug. 23, 1949

2,479,573

UNITED STATES PATENT OFFICE 2,479,573

GAS TURBINE POWER PLANT

Alan Howard, Schenectady, N. Y., assignor to General Electric Company, a corporation of New York Application October 20, 1943, Serial No. 506,930

7 Claims. (Cl. 60—41)

The present invention relates to power plants wherein a mixture of air and fuel is burned to provide gas which is utilized to operate a turbine, the turbine in turn being utilized to operate a compressor which supplies air for combustion purposes and to operate a load. The invention is especially well adapted as a power plant for aircraft and it is this application of it which I have elected to specifically illustrate and describe. It is to be understood, however, that the invention, particularly as to certain aspects, is not limited to such power plants but may be used wherever found applicable. In the case of aircraft power plants, I preferably utilize the exhaust from the turbine to effect jet propulsion of the aircraft, the power of the turbine available for propulsion purposes being divided between a propeller and a jet.

The object of my invention is to provide an improved construction and arrangement of power plant of this type which is compact so as to occupy a minimum of space, which is light in weight, a feature especially important for aircraft power plants, and which is efficient and reliable in operation.

For a consideration of what I believe to be novel and my invention, attention is directed to the following specification and the claims appended thereto.

Figure 8:
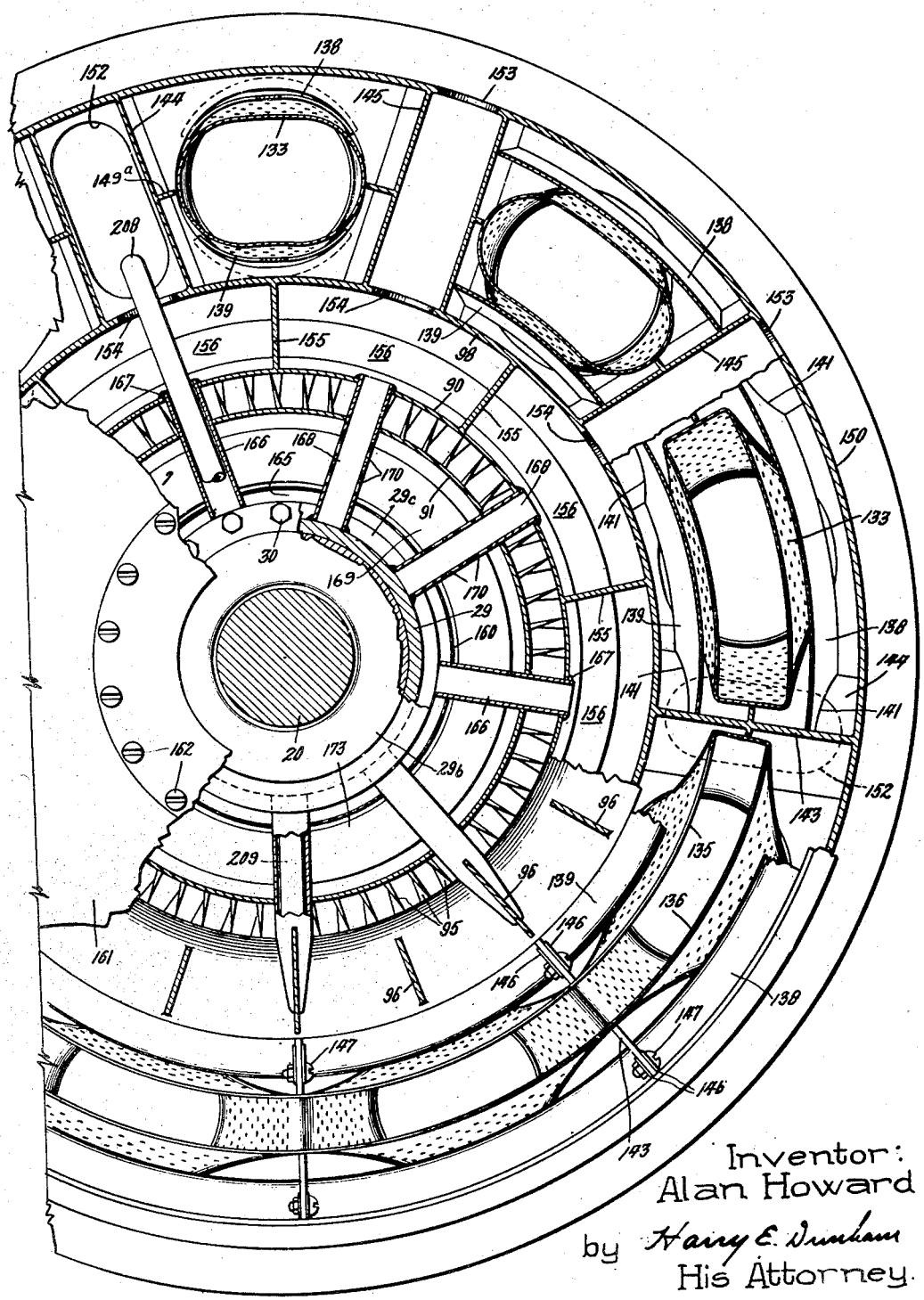
Figure 9:
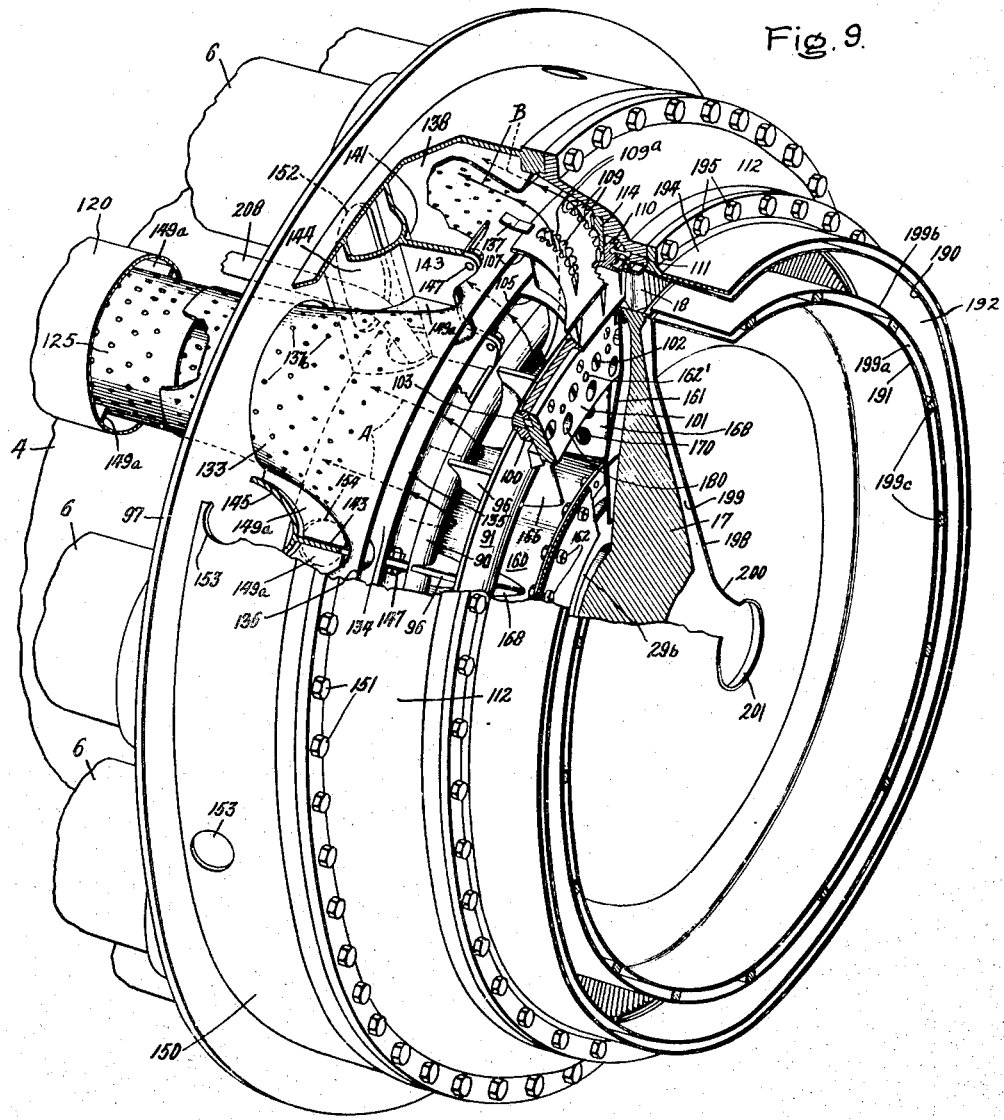
Figure 10:
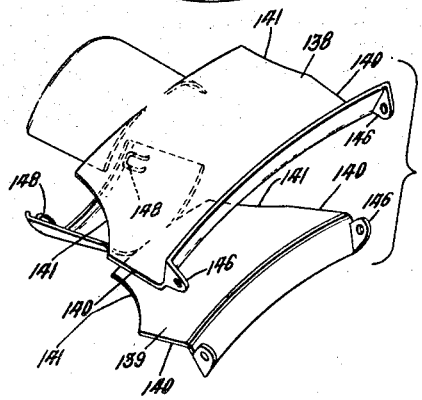

In the drawing, Fig. 1 is a perspective view of an aircraft equipped with propulsion power plants embodying my invention; Fig. 2 is a side view showing a wing and power plant, the nacelle being partly broken away to show the power plant; Fig. 3 is a side view partly in section and partly broken way, of the turbine or rear end of the power plant; Fig. 4 is a detail sectional view on a larger scale than Fig. 3, showing particularly a part of the turbine wheel cooling arrangement; Fig. 5 is a detail view showing the arrangement used in attaching the nozzle ring to its radially inner support; Fig. 6 is a detail face view of a portion of a cooling air directing plate for the turbine wheel; Fig. 7 is a detail plan view of a portion of an air deflecting ring; Fig. 8 is a cross-sectional view taken on an irregular section line, substantially 8—8, Fig. 3, on a larger scale than Fig. 3, and with certain parts broken away; Fig. 9 is a perspective view, partly broken away, of a part of the power plant; Fig. 10 is a detail perspective view of a part of one of the combustion chambers; Fig. 11 is a sectional view showing the forward or admission end of the power plant; Fig. 11a is a detail view of certain parts; Fig. 12 is a detail view of the casing structure of the compressor; Fig. 13 is a detail sectional view of a fuel feeding nozzle, and Fig. 14 is a detail sectional view of a combustion chamber. Figs. 3 and 11 are complementary views which when taken together are a longitudinal sectional view of the power plant with the central portion broken away. Fig. 3 is on a somewhat larger scale than is Fig. 11.

Referring to the drawing, 1 indicates an aircraft, the wings of which carry four nacelles 2 in each of which is mounted a power plant embodying my invention. While I have shown an aircraft having four power plants, i. e., four propellers, it is to be understood that this is only by way of example as an aircraft may be equipped with one or any greater number of such power plants. Each power plant drives a propeller 3. Each power plant comprises a rotary compressor 4, a gas turbine 5, a plurality of combustion chambers 6 in which fuel and air are burned to provide gas for operating the turbine, a gearing 7 through which the turbine drives its propeller, and sets of auxiliaries 8 driven through suitable gearing from the turbine shaft. Only one set of auxiliaries is indicated in Fig. 2. A second set is located on the diametrically opposite side of the shaft. This is indicated in Fig. 11. In the front end wall of the nacelle is an opening 9 for the admission of air to the power plant. This air is taken from directly behind the propeller, the propeller and the forward movement of the aircraft serving to ram air into the nacelle. This air is used for two purposes as explained hereinafter, (a) for supplying the compressor and (b) for cooling parts of the power plant. The nacelle is provided with forward and rearward transverse partition walls 10 and 10a which function to divide the nacelle into three compartments 11, 12 and 13. The gearing 7 and the auxiliaries 8 are located in the forward compartment 11; the compressor 4 and the major portions of combustion chambers 6 are located in the middle compartment 12, and the gas turbine 5 and the rear end portions of the combustion chambers 6 are located in the rear compartment 13. In wall 10 are a number of circumferentially spaced openings 14 for flow of cooling air from compartment 11 to compartment 12.

The rotors of the compressor and the turbine are carried by a quill shaft construction comprising an outer tubular shaft 15 and an inner shaft 16 (Figs. 3 and 11). On one end of inner shaft 16 (Fig. 3) is the turbine wheel comprising a solid disk 17 provided on its periphery with a ring of buckets 18 having a bucket covering 19 attached directly to the ends of the buckets. Preferably, wheel disk 17 and shaft 16 are formed as a unitary structure, the disk being provided with a hub 20 and shaft 16 being welded directly to the hub. Shafts 15 and 16 are connected together adjacent the turbine wheel by a plurality of circumferentially spaced splines or keys 21, six for example. The shaft structure adjacent to disk 17 is supported in a suitable bearing. In the present instance, I have indicated a ball bearing 22. The turbine wheel is thus overhung on the end of the shaft. The inner race of the bearing is fixed to shaft 15, being mounted between spaced rings 23 and 24, and the outer race is carried in a bearing seat 25 in which it is fixed by a ring nut 26. Bearing seat 25 is open on one side and on the other side is provided with a side wall 27 having packing teeth which pack against ring 23. Bearing seat 25 is carried in an inner bearing housing 28 which in turn is fixed in an outer bearing housing 29. The end walls 29ᵃ and 29ᵇ of the outer bearing housing are connected to outwardly projecting flanges 29ᶜ on the peripheral wall by rings of bolts 30 and they are provided with flanges having teeth which pack against shaft 15, hub 20 and flanges carried by rings 23 and 24. The several toothed packings serve to prevent leakage of lubricating oil from the bearing housing. Preferably the packing teeth are in the form of spiral threads so arranged that with rotation of the shaft, the ends tend to pump toward the inside of the casing. Attached to the end wall of the outer bearing housing adjacent to a wheel 40 and in spaced relation to the wheel and the end wall is an annular disk 31. Rotation of wheel 40 causes circulation of air around disk 31 due to the pumping action of the wheel. This serves to build up air pressure in the space between disk 31 and the bearing end wall to assist in preventing leakage of oil from the bearing housing.

Mounted on shaft 15 are wheels 32 which on their peripheries carry compressor vanes 33. The wheels have hubs which are shrunk on to the shaft, the hubs being held between a shoulder 34 at the turbine wheel end of the shaft and a nut 35 at the other end of the shaft. Also, the hubs are fixed to turn with the shaft by suitable keys 36. The peripheral portions of wheels 32 are enlarged to form annular rims or heads 37 to which the blades 33 are attached by suitable means, such as dovetailed connections, or welding, for example. The rims or heads 37 are each provided with an axially extending annular flange 38 which is provided at its free or outer end with an annular lip which locks under a shoulder on the adjacent head as indicated at 39. At the two ends of the rotors are wheels 40 and 41 provided with packing teeth on their peripheries. The wheel 40 is provided with an annular axially extending flange 42 which locks under a shoulder on the head of the adjacent wheel 32. In assembling the structure, the wheels 40, 32 and 41 are successively shrunk on to the shaft 15, the shoulder of each wheel rim being brought into firm engagement with the flange 42 of the preceding wheel with a shrink fit. This results in a rigid drum-like structure which carries blades 33 but one which at the same time is relatively light in weight. Any suitable number of wheels, i. e., compressor stages, may be provided, the number depending upon the size and operating conditions of any particular power plant. For example, a number of the order of fourteen may be provided.

It will be noted that the axially extending flanges 38 are arranged entirely on one side of each wheel and preferably the interlocking lips and shoulders 39 have a negative slope, i. e., are beveled inwardly, so the parts are hooked together as shown particularly in Fig. 11ᵃ. When a wheel is shrunk into place, not only is the hub shrunk to the shaft but also the shoulder on its rim is brought into shrink fit engagement with the lip on the flange 38 of the adjacent wheel thus locking the parts together with a shrink fit. Each flange 38, in addition to being overhung entirely on one wheel, is made relatively thin so that when the compressor is running, centrifugal force tends to expand the flange thus still more firmly clamping the lips and shoulders together. Thus when the machine is running, a good driving connection is maintained at the peripheries of the wheels. By this arrangement, there is provided a rigid structure without the necessity of welding the wheels together at the peripheries. This is of substantial advantage when the rotor is to be dismantled as the wheels can be removed successively by heating them to unshrink them and pulling them off axially.

The forward end of shaft 15 (Fig. 11) is supported in a suitable bearing such as a roller bearing 43 the inner race of which is fixed on shaft 15 between a sleeve nut 44 having a polygonal end to receive a wrench and a sleeve 45, and the outer race of which is carried in an inner bearing housing 46 which in turn is fixed in an outer bearing housing 47. The outer race is held between an end wall 48 of bearing housing 46 and a ring nut 49. End wall 48 has packing teeth which pack against the surface of sleeve nut 44. The bearing housings are supported in an annular ring 50 attached to an inner casing wall 51 by an annular wall 52 reinforced by radially extending webs 53 and 53ᵃ. A number of circumferentially spaced webs 53 and 53ᵃ may be provided, webs 53ᵃ extending well along wall 51 to stiffen the structure. The outer bearing housing is held between rings 54 fastened to opposite ends of ring 50 by a ring of spaced bolts 55. Carried by the one ring 54 are packing flanges 56 having packing teeth which cooperate with packing flanges 57 carried by sleeve 45. In each instance, the packing teeth may be in the form of spaced threads which serve to pump toward the inside of the bearing housing.

On the forward end of shaft 16 is the inner member 58 of a toothed coupling, the teeth of which mesh with teeth on an outer coupling sleeve 59 as is indicated at 60. Inner coupling member 58 is positioned between the end of shaft 15 and a nut 61 threaded on to the end of shaft 16 and is fixed to turn with the shaft by splines 62.

At its other end, outer coupling sleeve 59 is suitably connected to the gearing in housing 7 through which propeller 3 is driven. The gearing is not illustrated as its construction and arrangement forms no part of my present invention. It may be of any suitable construction.

Wall 51 forms a part of the casing for the coupling and gearing, it being connected at its forward end to the main gear casing by a flange 64. Connected to wall 51 by a number of circumferentially spaced webs 65 is an outwardly curved wall 66 which with wall 51 defines an annular air admission conduit 67 for flow of air to the first compressor stage.

Surrounding gear casing 7 is a wall 68 which at its forward end cooperates with the adjacent portion of nacelle wall 2 to define opening 9. The outer surface of wall 68 forms a continuation of the outer surface of wall 51 to provide a smooth continuous surface over which the air flows from opening 9 to admission conduit 67. The tubular housings 69 in which the drive shafts for the auxiliaries are located extend across this flow path (see Figs. 2 and 11) and such housings are made of wing-like section, i. e., streamlined, so that they interfere to a minimum extent with the air flow.

The stationary vanes of the compressor are indicated at 70. Each row of stationary vanes is carried by a ring 71 to which the vanes are attached by suitable means, such as by dovetail connections or by welding, for example. The stationary vane rings are made in arcuate sections suitably bolted together as is shown at 72 (Fig. 12) to enable them to be assembled with respect to the rows of rotating blades or vanes 33. Rings 71 are supported between two end rings 73 and 74 (see Figs. 11 and 3) and they are spaced apart and positioned relatively to each other by the end rings 73 and 74 and intermediate radially extending rings 75, the several rings 75 being provided with annular grooves into which fit annular projections on rings 71, as is indicated at 76. Adjacent intermediate rings 75 are fastened together by pluralities of circumferentially spaced studs 77, the primary function of which is to hold successive rings together while the structure is being assembled. The ring structure as a whole is tied together by a plurality of circumferentially spaced tie rods 78 which at one end thread into end ring 74 and at the other end receive nuts 79. At their peripheral outer edges rings 75 are spaced from end rings 73 and 74 and from each other by annular corrugated rings 80 (see Fig. 12) the edges of which fit into annular grooves 81 in the end and intermediate rings. Rings 80 are formed from relatively thin metal and are corrugated to give them increased strength. Surrounding rings 75 is an outer casing wall 82.

The rings 75 have an internal diameter greater than the outer diameter of the rotor blade rings. This enables the rings 75 to be continuous rings since they may be put into place by passing them axially over the rotor. Thus the stator comprises the rings 71 which are made in sections bolted together and the continuous rings 75. In assembling the stator, the sections of each blade ring 71 are positioned from the side and bolted together and the rings 75 are positioned from the end. Preferably the joints 72 between sections of successive rings 71 are staggered relatively to each other around the stator. The use of continuous rings 75, especially when coupled with a staggered arrangement of the joints between rings 71, serves to give a rigid stator structure not likely to get out of round. Casing 82 serves to hold the entire stator structure assembled and in axial alignment. It may be in the form of a one piece cylinder assembled axially or it may be split axially, the respective parts being assembled from the side and bolted together.

In both the rotor and the stator the wheels and rings which carry the blades may be in the initial or first stages made from aluminum and the remaining wheels and rings made from steel. The use of aluminum is advantageous in that it decreases the weight of the machine. The number of stages in which aluminum is used depends on the temperatures met with in the successive stages, aluminum being used until a stage is reached at which the temperature is so high as to make its use not desirable. For example, a compressor having a number of stages of the order of fourteen may utilize aluminum in initial stages to a number of the order of six. My improved rotor and stator construction enables the change from aluminum to steel to be made readily at any stage since the parts are not welded together but are connected by shrink fits only. The flexibility of the ring 38 takes care of the difference in the coefficients of expansion between aluminum and steel at the stage where conversion from aluminum to steel takes place.

Ring 73, walls 66 and 51 which define air admission conduit 67, webs 65, wall 52, ring 50 and webs 53 and 53ᵃ are formed preferably as a cast unitary structure. Carried by wall 51 are packing flanges 83 which cooperate with teeth on packing wheel 41 and with teeth 84 on the first stage compressor wheel 32.

The space between wall 52 and wheel 41 forms a pressure balancing chamber 85 to which air pressure is conveyed by a conduit which at one end connects with chamber 85 and at the other end connects with the discharge end of the compressor or with an intermediate compressor stage of suitable pressure. In the present instance, this conduit is indicated by the pipe 86 (Fig. 11) which extends to a suitable air pressure point of the compressor.

The space between wheel 41 and the first stage compressor wheel 32 is connected by a number of circumferentially spaced conduits 87 to a region of lower pressure, for example to atmosphere. Conduits 87 are shown as being formed in webs which extend between the one flange 83 and the wall 52. This serves to prevent building up of air pressure in this space by leakage past the packing between wheel 41 and the packing flange 83 with which it cooperates.

With the foregoing arrangement, wheel 41 forms in substance a balancing piston, the air pressure in chamber 85 acting on it in a direction to oppose the thrust on the compressor rotor at its high pressure end.

Formed integral with and carried by end ring 74 are curved annular walls 90 and 91 which define an annular discharge conduit 92 for the compressor. At its inlet end wall 91 has a surface which cooperates with packing teeth on packing wheel 40. Carried by sleeve 93 attached to ring 74 by bolts 94 are two rings of stationary air directing vanes 95 which in effect are located in the inlet end of discharge conduit 92. Vanes 95 are shaped and positioned to take the swirl out of the air discharged from the last compressor stage, directing the air in smooth even lines to the entrance end of discharge conduit 92. Walls 90 and 91 are united by a plurality of spaced webs 96. Formed integral with the peripheral edge of wall 90 and with the radially inner edge of an annular wall 97 carried by end ring 74 is an inner casing wall 98 which with wall 90 and ring 74 defines an annular air space 99.

A modified form of the axial flow compressor is disclosed in my copending application, Serial No. 679,247, filed June 25, 1946, a continuation-in-part of the present application.

The outer peripheral edge of wall 91 is reinforced by an integral ring 100 to which is attached an end plate 101 by screws 102. Supported between end plate 101 and a clamping ring 103 is a flange 104 carried by the radially inner wall 105 of a nozzle ring which functions to supply gases to the buckets 18. At circumferentially spaced points flange 104 is provided with depending lugs 104ᵃ (see Fig. 5) located in pockets 104ᵇ in end plate 101 and serving to fix wall 105 and end plate 101 circumferentially relatively to each other. Clamping ring 103 is fastened to end plate 101 by screws 106.

The nozzle ring comprises the radially inner wall 105 and a radially outer wall 107 between which are located the nozzle partitions 108. The nozzle partitions are hollow, i. e., they have radially extending passages through them which passages are in line with similarly shaped openings in nozzle ring walls 105 and 107 (see Fig. 9) thus forming passages 109 for the flow of cooling air. The walls defining passages 109 are provided preferably with inwardly projecting cooling fins 109$^a$ to provide maximum cooling effect.

On outer nozzle ring wall 107 is an annular flange 110 which is connected by an expansion ring 111, dumbbell-shaped in cross section, to an outer wall 112. Flanges 104 and 110 are at the discharge side of the nozzle ring and serve to support this side of the ring in a manner to permit the nozzle ring to expand and contract due to temperature changes, flange 104 being permitted to slide between plate 101 and ring 103, and ring 111 being adapted to yield radially. Attached to wall 112 by a ring of studs 113 is a clamping ring 114 having circumferentially spaced inwardly projecting lugs 115 which engage flange 110 to assist in holding it in position and to guide any radial movement. Also carried by ring 114 between alternate lugs 115 are circumferentially spaced angularly extending air deflecting projections 116. Between the remaining lugs 115 are air flow passages 117 (see Fig. 7).

The combustion chambers 6 are arranged concentrically around the compressor, each being a complete gas generating unit. Each combustion chamber comprises an outer cylindrical casing 120 supported at one end (see Fig. 3) by wall 97 through the intermediary of an annular flange 121 formed integral with wall 97 and to which the casing is attached by a split clamping ring 122, the ends of which are fastened together by bolts 122$^a$. It may be a one piece spring ring split at one point only or it may be in two or more sections bolted or hinged and bolted together. The other end of casing 120 (see Fig. 11) rests on a seat 123 attached to compressor casing wall 82. The several combustion chambers may be held down on their respective seats 123 by any suitable means. In the present instance, they are shown as being held against the seats by a metal strap 124 which extends around all of them. This serves to hold the combustion chambers sufficiently tight but at the same time permits them to slide axially when expanding or contracting due to temperature changes. Thus, the several gas generating units are supported in spaced relation to each other, and each in spaced relation to casing 82.

Inside outer casing 120 in spaced relation thereto is an inner cylindrical casing 125. At one end (Fig. 11) casings 120 and 125 are provided with end walls 126 and 127 through which extends the outer tube 128 of a fuel burner through which fuel is supplied to the combustion chamber. The fuel burner may be of any suitable type. In the present instance, it is shown as being of the recirculating type and as comprising an outer tube 128 which connects with a circular fuel supply header 129 and an inner oil tube 130 (see Fig. 13) which connects with a circular fuel discharge header 131. Fuel supply header 129 may be supplied with fuel under suitable pressures from any suitable source of supply. In operation, fuel flows in through tube 128. A part of the fuel is discharged through the end of tube 128 into the combustion chamber. The remainder flows out through tube 130. This effects a continuous circulation of fuel through the fuel burner, the purpose of which is to carry heat away from the burner to cool it and to provide superior control and atomization. At 132 are indicated ignition plugs.

At its other end casing 125 is connected with a tapered discharge section 133 through which gases are conveyed to the nozzle ring. The shape of discharge section 133 is best shown in Fig. 9 where it will be seen that the section is gradually widened circumferentially and flattened radially until at its discharge end it conforms to the contour of the admission space to the nozzle ring, i. e., to the space at the admission side of inner and outer nozzle rings 105 and 107. The flattened walls of the discharge section 133 of the several gas generating units are united at their discharge ends to form a continuous annular discharge passage 134. Or, viewed from a different aspect, there are provided two annular walls 135 and 136 which define passage 134 and formed integral with which are the walls which form the several discharge sections 133. With this arrangement, gases from the several combustion chambers are distributed evenly to the entire ring of nozzles. As shown in Fig. 3, walls 135 and 136 project a short distance within nozzle rings 105 and 107 and are held by straps or clips 137 welded to walls 135 and 136 and projecting over walls 105 and 107.

The adjacent ends of casing 125 and discharge section 133 telescope one within the other as shown clearly in Figs. 3 and 9. Casing 125 is held in spaced relation to casing 120 by a plurality of spacing straps 137$^a$ as shown in Fig. 14.

In inner casing 125 and discharge section 133 are openings 137$^b$ for flow of air therethrough to the combustion chamber.

Supported respectively above and below each discharge section 133 in spaced relation thereto is a pair of curved walls 138 and 139, shaped as shown in Fig. 10, to conform generally to the contour of the wall of discharge section 133. They extend only part way around discharge section 133. Their side edges at 140 are shaped to fit against the adjacent surfaces of partition plates 143 projecting from and formed integral with a series of circumferentially spaced hollow posts or conduits 144 and 145, and their side edges at 141 are curved to fit the contour of such posts (see Fig. 9). Walls 138 and 139 are provided with ears 146 which are attached to partition plates 143 by bolts 147. At their ends remote from ears 146 walls 138 and 139 engage annular casing 120; at such ends are spacing clips 148 (Fig. 10) which serve to position these ends of walls 138 and 139 with respect to the wall of discharge section 133. Walls 138 and 139 in connection with the adjacent surfaces of partition plates 143 and posts 144 and 145 define generally annular air passage 149 surrounding discharge section 133. This air passage and also the annular air passage between walls 120 and 125 is divided longitudinally into upper and lower halves by longitudinally extending fins 149$^a$ (Fig. 9) carried by adjacent wall parts. As shown in Figs. 3 and 9, there is provided in wall 97 inside each supporting flange 121 an opening through which project the walls forming the tapered discharge end of each burner.

Posts 144 and 145 are located between wall 98 and an annular outer casing 150 which is formed integral with wall 97 and to which is connected casing wall 112 by a ring of bolts 151. Posts 144 and 145 are alike except that the interiors of posts 144 are connected by side openings 152 with the space between combustion chambers 6 while the interiors of posts 145 are connected by openings 153 in casing wall 150 directly to the region between wall 150 and the adjacent portion of the nacelle wall 2. At their inner ends posts 144 and 145 are connected by openings 154 to the space between walls 98 and 90, i. e., to annular air space 99. There are more posts 145 than there are posts 144, there being a post 144 located between each two posts 145 (see Fig. 8). Annular air space 99 is divided by partition walls 155 (Fig. 8) into a plurality of compartments 156, one with which each of the posts 144 and 145 communicates.

Surrounding bearing housing 29 is a wall 160 attached to a disk 161 by a ring of bolts 162. Disk 161 at its periphery is attached to end plate 101 by a ring of screws 162', it being spaced from plate 101 by bosses 163 through which screws 162' extend (see Fig. 4). Disk 161 stands in spaced relation to the adjacent surface of turbine wheel 17 to define a passage 164 for the flow of cooling air. The radially inner portion of disk 161 terminates short of hub 20 and forms with wall 160 a cooling air chamber 165 which surrounds bearing housing 29 and is connected to cooling air passage 164 through the space between the inner edge of disk 161 and hub 20.

The compartments 156 with which posts 144 connect are connected by oblong streamline shaped posts 166 to cooling air chamber 165. These posts are shown in intermediate narrow dimensions in Fig. 8 and in wide dimensions in Fig. 3. At their radially outer ends posts 166 extend through walls 91 and 90 and are fixed in wall 90 by suitable means, such as by welding as shown at 167. At their radially inner ends posts 166 extend through wall 160 and rest on flanges 29ᶜ so that air flowing in through posts 166 may discharge into cooling air chamber 165.

The compartments 156 with which posts 145 connect are connected by oblong streamline shaped posts 168, similar to posts 166, to the annular chamber 169 between wall 160 and the adjacent wall 91. To this end, the inner ends of posts 168 extend through wall 160 and are sealed by being welded to bearing housing 29, the inner end of posts 168 being shaped to conform to the contour of the outer surface of housing 29. The side walls of posts 168 are provided with openings 170 which connect the interior of the posts to chamber 169. In Fig. 3, post 166, at its upper left hand corner, has its first wall broken away to expose its interior, and at its lower right hand corner has both its walls broken away to show a portion of a post 168.

The webs 96 which tie together walls 90 and 91 are located some in line with posts 166 and 168 and others between the posts. The webs which are in line with posts 166 and 168 extend through slots in the posts and are welded thereon to more firmly tie the structure together. In Fig. 3, an inner edge of a web 96 is indicated at the dotted line 171.

It will be noted that outer casing wall 150 and inner casing wall 98 are rigidly tied together by the circumferentially spaced posts 144 and 145 and that the inner casing wall 98 in turn is rigidly connected to wall 90 by partition walls 155; and that walls 90 and 91 which define the discharge passage for the compressor are rigidly tied together and to the bearing housing by posts 170. This forms a compact unitary structure all rigidly attached to and carried by the bearing housing and one in which the posts serve both as struts and as ducts for conveying cooling medium. Also, the arrangement provides a structure which may be made comparatively light in weight and of minimum diameter, both of which are especially important in aircraft installations.

The left hand edge of annular wall 160 (Fig. 3), terminates closely adjacent to rotating wheel 40 and just radially beyond such edge there is provided a packing means comprising a packing fin 172 on the inner edge of an annular wall 173 carried by wall 91 which packs against, i. e., has a close clearance with, an annular projection 174 carried by wheel 40. Wall 173 and fin 172 form with the adjacent portion of wheel 40 an annular thrust balancing chamber which is connected with the region beyond the last stage compressor wheel through the packing between the periphery of wheel 40 and the adjacent portion of wall 91. Pressure builds up in this chamber due to leakage past the packing. Its value is determined by the position of fin 172 with respect to projection 174. Such pressure is balanced against the pressure in chamber 85 at the other end of the rotor. If, as viewed in Figs. 11 and 3, the rotor tends to shift toward the left, the leakage space between fin 172 and projection 174 will be increased in area thus permitting the pressure in the balancing chamber to decrease. With this arrangement, the rotor with little axial movement will be maintained in a balanced position.

The radially outer edge of disk 161 is provided with cooling air directing means as shown particularly in Figs. 4 and 6. The outer edge of the disk is provided with bent-out ears 175 which provide passages 176 for flow of cooling air from the side of the disk adjacent to the turbine wheel, i. e., from passage 164 to the opposite side; and on such opposite side are curved fluid directing vanes 177 attached to disk 161 by ears 178. Around the disk is a cover ring 179 which serves to prevent cooling air from flowing radially outward. The spaces between the vanes at their radially inner ends are connected to chamber 169 by openings 180 in end plate 101.

On the discharge side of the bucket wheel are walls 190 and 191 which define between them an annular discharge passage 192 for the exhaust gases issuing from the turbine buckets, the passage merging into a discharge conduit 193 through which the gases pass to atmosphere. Passage 192 and discharge conduit 193 are so shaped that the gases will discharge from them at high velocity whereby a jet propulsion effect tending to drive the aircraft forward will be obtained. Outer wall 190 at its end adjacent to the turbine wheel is fixed to a flange ring 194 which in turn is fastened to casing wall 112 by a ring of bolts 195. Flange ring 194 has a lip which in cooperation with flange 110 holds in place a sealing ring 196 located inside ring 111. Sealing ring 196 has an annular packing fin 197 which packs against bucket cover 19 to prevent leakage of gases through the space between the bucket cover and ring 196. Sealing ring 196 serves to prevent gases discharged from the nozzle ring from coming into contact with expansion ring 111, thus protecting ring 111 from undue heating.

On the discharge side of wheel 17 is a disk 198 which defines a cooling space 199 for flow of cooling air across the surface of the wheel. Disk 198 has a curved wall 200 at its center which defines an inlet opening 201 for cooling air. At its periphery, space 199 opens into a discharge passage 199ª formed by an inner wall 199ᵇ fixed in spaced relation to wall 191 by spacers 199ᶜ, see Fig. 9. Inside wall 191 is a cone-shaped wall 202 which with wall 191 and disk 198 forms a cooling air chamber 203 and which serves to direct cooling air to opening 201. The portion of wall 191 which forms a part of cooling air chamber 203 is provided with a liner 204 spaced from it in any suitable manner. This serves to minimize the transfer of heat from the exhaust gases to the cooling air. Liner 204 is shown in Fig. 3. It has been omitted in Fig. 9 for purposes of illustrating other parts.

Cooling air is carried to cooling chamber 203 by a plurality of conduits 206 which take air from chamber 12 (see Fig. 2), the inlet end of the conduit being fixed in wall 10ª and the discharge end extending through walls 190, 191 and 204. Where it extends across discharge passage 192, the conduit is flattened in cross section and streamlined so as to disturb to a minimum the flow of gases through passage 192. At its rear end, the wall of nacelle 2 is provided with one or more slots 207 for escape of air from the space between the nacelle wall and wall 190.

Lubricant for the bearings is conveyed to and from the bearings by suitable pipe lines. It may be obtained from any suitable source of supply. The piping for supplying the bearing adjacent the turbine wheel is shown in Figs. 3 and 8. The piping for the other bearing may be similar. The lubricant supply pipe is indicated at 208. It extends through a post 144 and a post 166 and feeds oil to suitable passages in the bearing housing shown in Fig. 3. The oil is carried away from the bearing through pipe line 209.

The auxiliaries may comprise an electric starting motor, a fuel pump, a lubricant oil pump, a generator, a tachometer and such other devices as are needed. They may be driven directly from the rotor shaft or from the main gearing through suitable jack shafts and additional gearing. Dividing the auxiliaries into a plurality of groups arranged on opposite sides of the shaft permits of a compact arrangement of minimum overall diameter.

The power plant as a whole may be supported in any suitable manner. In the present instance, suitable mounting pads 210 (Fig. 2) are attached to the outer peripheral portion of wall 97 which extends beyond walls 150 and 121 to provide a surrounding flange, there being a pad 210 on each side of the structure. Suitable supporting brackets may be attached to these pads.

In operation, the starting motor is utilized to turn the rotor until sufficient pressure has been built up by the axial compressor to support combustion in the combustion chambers, after which gases from the combustion chambers are discharged through the nozzle ring against the turbine buckets to drive the turbine. The starting motor is then disconnected and the turbine wheel, driven by gases from the combustion chamber, drives the compressor and the propeller or other load.

Air enters the forward compartment 8 through opening 9 and flows through opening 67 to the first stage of the compressor. This air is compressed by the compressor and is discharged through annular discharge conduit 92 to the combustion chambers. The air flows to the respective combustion chambers through the annular passages 149 and the numerous openings 137ᵇ. Fuel enters through fuel nozzles 128 and is mixed with the air and burned. The nozzle ring lies directly across the path of flow of the air through conduit 92. A portion of the air flows through the hollow nozzle partitions 108, thus cooling the nozzle ring structure. The webs 96 serve to direct the flow of air and to prevent swirling. The arrows A in Figs. 3 and 9 indicate the path of flow of air beneath the nozzle ring and the arrows B indicate the path of flow of air through the hollow nozzle partitions. Some of the air which passes through the hollow nozzle partitions is caught by the deflecting projections 116 (Figs. 3 and 7) and is deflected back into the annular space above expansion ring 111, the air caught by each deflecting projection flowing in opposite circumferential directions and out again through the spaces 117. This serves to effect a circulation of air adjacent the upper surface of expansion ring 111 to cool it.

Openings 137ᵇ are so distributed that complete combustion of the fuel takes place during movement of the fuel from the end of the fuel nozzle to the discharge end of the combustion chamber. It will be seen that the combustion chamber proper, i. e., the chamber defined by walls 125 and 133 is completely surrounded by air being supplied to the combustion chamber. This results in keeping the walls 125 and 133 relatively cool.

Some of the air which enters through opening 9 passes through openings 14 in partition wall 10 to chamber 12. This air circulates around the outer walls of the several combustion chambers to cool them and then flows through side openings 152 to the interior of the post 144 from whence it flows radially inward to the compartments 156 with which posts 144 connect. From these compartments, the air flows radially inward through posts 166 to the cooling chamber 165 which surrounds the bearing adjacent to turbine wheel 17. The cooling air flows around the bearing to cool it and thence through the space between disk 161 and hub 20 and radially outward along the side of the turbine wheel to the periphery of the wheel. At the periphery of the wheel, the air flows through openings 176 where it is caught by the vanes 177 and directed downwardly through openings 180 in end plate 101 to chamber 169. The course of this air is indicated by the arrows C in Figs. 3 and 4. From chamber 169, the air flows through openings 170 in posts 168 to the interior of the posts as indicated by the arrows D and through the posts to air spaces 156 with which posts 168 connect. From these chambers, air flows out through posts 145 and openings 153 to the interior of the nacelle from which it is discharged through slits 107. This air serves to cool the bearing and the one side of the turbine wheel.

Air is conveyed from the compartment 12 through pipes 206 to chamber 203 from which it flows, as indicated by the arrows E (Fig. 3), through opening 201 and along the surface of the turbine wheel to the periphery of the wheel where it is discharged rearwardly to the space between walls 191 and 199ᵇ. The flow of gases discharged from the turbine wheel over wall 199ᵇ serves as the pumping fluid of an ejector for drawing air through the annular space between walls 191 and 199ᵇ. Thus, this cooling air is turned into the direction of flow of the main gas stream and is evenly and smoothly mingled with it, disturbing to a minimum the flow of exhaust gases through the annular discharge conduit 192.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a high temperature gas turbine powerplant, the combination of an axial flow compressor with a substantially cylindrical casing having an inlet at one end and an annular outlet at the other end and a rotor with a shaft projecting from the discharge end of the casing, an axial flow turbine wheel secured to the shaft closely adjacent the compressor outlet, a plurality of elongated substantially cylindrical axially disposed combustors arranged around the compressor circumferentially spaced from each other and radially spaced from the compressor with the discharge ends of the combustors adjacent the outlet end of the compressor, a nozzle ring at the compressor side of the turbine wheel and adapted to deliver hot motive fluid to the turbine rotor, walls defining conduits for conveying hot motive fluid in a substantially axial direction from the combustors to the nozzle ring, and walls forming short direct conduits for conveying all the air discharged from the compressor outlet over the surfaces of the nozzle ring and directly to the combustors whereby the air flowing from the compressor to the combustors is preheated and serves to cool the nozzle ring.

2. In a high temperature gas turbine powerplant, the combination of an axial flow compressor with a substantially cylindrical casing having an inlet at one end and an annular outlet at the other end and a rotor with a shaft projecting from the discharge end of the casing, an axial flow turbine wheel secured to the shaft closely adjacent the compressor outlet, a plurality of elongated substantially cylindrical axially disposed combustors arranged around the compressor circumferentially spaced from each other and radially spaced from the compressor with the discharge ends of the combustors adjacent the outlet end of the compressor, a nozzle ring at the compressor side of the turbine wheel and including inner and outer ring members connected by a plurality of circumferentially spaced substantially radially arranged nozzle partitions having radially extending passages therethrough, walls defining conduits for conveying hot motive fluid in a substantially axial direction from the combustors to the nozzle ring, and walls forming short direct conduits for conveying air discharged from the compressor outlet over the inner surface of the inner nozzle ring member, through the nozzle partition passages and over the outer surface of the outer nozzle ring member, thence directly to the combustors, whereby the air is preheated and the nozzle parts are cooled.

3. In a high temperature gas turbine powerplant, the combination of an axial flow compressor with a substantially cylindrical casing having an inlet at one end and an annular outlet at the other end and a rotor with a first shaft end portion projecting from the inlet end of the compressor casing and adapted to be connected to a load device, the compressor shaft having a second end portion projecting from the discharge end of the casing, bearing means for said second shaft end portion arranged closely adjacent the discharge end of the compressor, an axial flow turbine rotor secured to said second shaft end portion in overhung relation to said bearing, a plurality of elongated substantially cylindrical axially disposed combustors arranged around the compressor circumferentially spaced from each other and radially spaced from the compressor with the discharge ends of the combustors adjacent the outlet end of the compressor, a nozzle ring at the compressor side of the turbine wheel and adapted to deliver hot motive fluid to the turbine wheel, walls defining conduits for conveying hot motive fluid in a substantially axial direction from the combustors to the nozzle rong, and walls forming short direct conduits for conveying all the air discharged from the compressor outlet over the surfaces of the nozzle ring and directly to the combustors, whereby the air flowing from the compressor to the combustors is preheated and serves to cool the nozzle ring.

4. In a high temperature thermal powerplant, the combination of an axial flow compressor with a substantially cylindrical casing having an inlet at one end and an annular outlet at the other end and a rotor with a shaft projecting from one end of the casing, motor means connected to said shaft end portion for driving the compressor, a plurality of elongated substantially cylindrical, axially disposed thermal reaction units arranged around the compressor circumferentially spaced from each other and radially spaced from the compressor with the discharge ends of the units adjacent the outlet end of the compressor, a nozzle ring coaxial with the compressor and adjacent the outlet end thereof, the nozzle ring including radially spaced concentric inner and outer ring members connected by a plurality of circumferentially spaced substantially radially arranged nozzle partitions having radially extending cooling fluid passages therethrough, walls defining transition conduits for conveying hot reaction products in a substantially axial direction from the thermal reaction units to the nozzle ring, and walls forming short direct passages for conveying fluid discharged from the compressor outlet over the inner surface of the inner nozzle ring member, at least part of said fluid flowing through the cooling passages of the nozzle partitions and over the outer surfaces of the outer nozzle ring member, thence directly to the reaction units, whereby the air is preheated and the nozzle parts are cooled.

5. In a high temperature thermal powerplant, the combination of an axial flow compressor with a substantially cylindrical casing having an inlet at one end and an outlet at the other end, a plurality of elongated substantially cylindrical axially disposed thermal reaction units arranged around the compressor circumferentially spaced from each other and radially spaced from the compressor with the discharge ends of the units adjacent the outlet end of the compressor, said reaction units including an inner liner defining a reaction space and an outer housing surrounding and spaced from the inner liner to define a fluid supply space therebetween, a nozzle ring coaxial with the compressor and adjacent the outlet end thereof and including radially spaced concentric inner and outer ring members connected by a plurality of circumferentially spaced substantially radially arranged nozzle partitions having radially extending cooling fluid passages therethrough, walls defining conduits for conveying hot reaction products in a substantially axial direction from said reaction spaces to the nozzle ring, inner and outer concentric annular walls defining an annular conduit for conveying air from the compressor outlet to said fluid supply spaces of the reaction units and to the cooling passages of the nozzle partitions, whereby the fluid discharged from the compressor flows by short direct paths over the radially inner surface of the inner nozzle ring member and through the nozzle cooling fluid passages and over the outer surfaces of the outer nozzle ring member, thence directly to said fluid supply spaces, whereby the nozzle parts are cooled and the fluid is preheated.

6. In a high temperature thermal powerplant, the combination of an axial flow compressor with a substantially cylindrical casing having an inlet at one end and an annular outlet at the other end and a rotor with a shaft projecting from one end of the casing, motor means connected to said shaft end portion for driving the compressor, a plurality of elongated substantially cylindrical, axially disposed thermal reaction units arranged around the compressor circumferentially spaced from each other and radially spaced from the compressor with the discharge ends of the units adjacent the outlet end of the compressor, means for supporting the reaction units including an annular wall extending radially outward from the discharge end of the compressor casing and having a circumferential row of openings, means for securing the discharge end portions of the units to said wall, a nozzle ring coaxial with the compressor and axially spaced from the discharge end thereof, walls defining transition conduits for conveying hot reaction products in a substantially axial direction from the reaction units to the nozzle ring, each of said transition conduits being disposed through one of said openings in the support wall, and walls forming short direct passages for conveying all the fluid discharged from the compressor over the exterior surfaces of the nozzle ring and said transition conduits to the respective reaction units, whereby the fluid is preheated and the nozzle parts and transition conduits are cooled.

7. A thermal powerplant in accordance with claim 6 in which the reaction unit support means includes circumferential flanges projecting axially and surrounding the respective openings in the annular support wall, and attaching means comprising quick-detachable band clamps securing the discharge ends of the respective units to said flanges.

ALAN HOWARD.

REFERENCES CITED

The following references are of record in the file of this patent:

UNITED STATES PATENTS

| Number | Name | Date |
|---|---|---|
| 1,529,925 | Soy | Mar. 17, 1925 |
| 1,854,615 | Lasley | Apr. 19, 1932 |
| 1,931,545 | Holzwarth | Oct. 24, 1933 |
| 1,958,145 | Jones | May 8, 1934 |
| 2,050,349 | Lysholm et al. | Aug. 11, 1936 |
| 2,080,425 | Lysholm | May 18, 1937 |
| 2,085,761 | Lysholm | July 6, 1937 |
| 2,162,956 | Lysholm | June 30, 1939 |
| 2,244,467 | Lysholm | June 3, 1941 |
| 2,256,198 | Hahn | Sept. 16, 1941 |
| 2,280,835 | Lysholm | Apr. 28, 1942 |
| 2,323,617 | Osborne | July 6, 1943 |
| 2,326,072 | Seippel | Aug. 3, 1943 |
| 2,371,872 | Caldwell et al. | Mar. 20, 1945 |

FOREIGN PATENTS

| Number | Country | Date |
|---|---|---|
| 541,349 | Great Britain | Nov. 24, 1941 |
| 219,485 | Switzerland | Feb. 15, 1942 |

OTHER REFERENCES

"Flight" of Sept. 13, 1945, pages 282 to 284, inclusive.

"Aircraft Engineering" of December 1945, pages 342 to 347, inclusive.